United States Patent Office 3,544,681
Patented Dec. 1, 1970

3,544,681
ANIMAL FEED COMPOSITIONS AND METHODS
Gino J. Marco, Webster Groves, and Robert B. Grainger, Creve Coeur, Mo., assignors to Monsanto Company, St. Louis, Mo., a corporation of Delaware
No Drawing. Filed June 12, 1967, Ser. No. 645,512
Int. Cl. A61k 27/00; A23k 1/00
U.S. Cl. 424—180                       15 Claims

ABSTRACT OF THE DISCLOSURE

Animal feed composition containing a growth-promoting amount of at least one compound of the formula

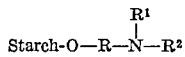

wherein R is alkylene of at least 2 and not more than 3 carbon atoms, and $R^1$ and $R^2$ are each selected from the group consisting of hydrogen, alkyl, aryl and aralkyl of not more than 18 carbon atoms.

---

This invention relates to animal feed compositions and to methods of improving growth response in animals.

The term "D.S." as used herein and in the appended claims means the average number of hydroxyl groups substituted with amino alkyl groups in the starch per anhydroglucose unit. Each anhydroglucose unit in the starch molecule contains three hydroxyl groups; therefore, the maximum D.S. possible is three.

The term "starch" as used herein and in the appended claims is inclusive of gelatinized and ungelatinized starch derived from any source e.g., corn, wheat, tapioca, potato, waxy maize, sago, rice, waxy sorghum, sweet potato, arrowroot and the like.

In accordance with the present invention, it has now been found that certain amino alkyl ethers of starch are useful growth promoters for animals. Animal diets containing the amino alkyl ethers of starch elicit a substantially greater weight gain and feed efficiency response in animals than when said diets are used alone. The growth promoting compounds are also useful for the improvement of carcass quality in cattle as manifested by increased marbling.

The improved weight gain and feed efficiency response in animals is accomplished in accordance with this invention by a method which comprises orally administering to the animal a growth-promoting amount of at least one amino alkyl ether of starch of the formula

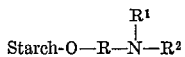

wherein R is alkylene of at least 2 and not more than 3 carbon atoms, and $R^1$ nd $R^2$ are each selected from the group consisting of hydrogen, alkyl, aryl and aralkyl of not more than 18 carbon atoms.

The compounds of the above formula are useful in animal feeds generally, for example, poultry, swine and ruminant feeds, but they are particularly advantageous when employed in ruminant feeds for cattle and sheep.

In the above formula $R^1$ and $R^2$ can be hydrogen, alkyl such as methyl, ethyl, n-propyl, isopropyl, n-butyl, sec-butyl, isobutyl, tert-butyl, amyl, hexyl, heptyl, octyl, nonyl, decyl, undecyl, dodecyl, octadecyl and the various homologues and isomers of alkyl of not more than 18 carbon atoms, aryl such as phenyl, biphenyl, naphthyl and the like and aralkyl such as benzyl, phenylethyl, diphenylmethyl and the like.

The amino alkyl ethers of starch of the above formula are well-known in the art and can be prepared by, e.g., the processes described in detail in U.S. Pats. 2,813,093, 2,975,124 and 3,208,999.

The following example, in which parts and percent are expressed by weight unless otherwise indicated, further illustrate the advantages of this invention.

A basal ration having approximately the following composition was used in the following example.

| Component: | Percent |
|---|---|
| Ground corn | 27.45 |
| Soybean meal (50%) | 18.90 |
| Defluoroinated phosphate (18% P) | 0.81 |
| Iodized salt | 0.45 |
| Trace minerals | 0.09 |
| Ground corn cobs | 10.00 |
| Molasses | 8.10 |
| Chopped alfalfa hay | 34.20 |

Vitamin A 10 MIU/gm. (275 gms./ton).

EXAMPLE 1

Sheep feeding studies were carried out with the above basal ration and the amino alkyl ethers of starch listed below in Table I. One group of sheep was fed the basal ration without an amino alkyl ether of starch additive to serve as control. The feed efficiency as determined from the average daily weight gain and average daily feed consumption for each group of sheep, self-fed, over a twenty-one day period is set forth in Table I.

TABLE I

| Compound | Concentration, percent | Feed efficiency, percent of control |
|---|---|---|
| Control | | 100 |
| Starch-O-CH₂CH₂-NH₂ 2.3% nitrogen; D.S. 0.28 | 0.005 | 159 |
| Starch-O—CH₂CH₂—NH₂ 0.52% nitrogen; D.S. 0.065 | 0.0005 | 128 |

The amino alkyl ethers of starch useful in this invention are incorporated in animal feed compositions in an effective amount over a wide range of concentrations. Significant animal responses are obtained with feed compositions containing from about 0.0001% by weight to about 0.1% by weight of amino alkyl ethers of starch. Preferably, the feed compositions contain from about 0.0005% by weight to about 0.05% by weight of amino alkyl ethers of starch.

The amino alkyl ethers of starch useful in this invention have a D.S. of at least about 0.01. Preferably the D.S. is at least about 0.1.

Based on a fattening lamb consuming about 3 pounds of ration per day and cattle each consuming about 20 pounds of ration per day, the amino alkyl ethers of starch are administered to sheep in an amount from about 0.0013 gm. to about 1.3 gm. per head per day, and to cattle in an amount from about 0.009 gm. to about 9.0 gm. per head per day. The amino alkyl ethers of starch are preferably administered to sheep in an amount from about 0.007 gm. to about 0.7 gm. per head per day and to cattle in an amount from about 0.045 to about 4.5 gm. per head per day. However, the preferred amount will vary to some extent depending upon the age, weight and environment of the particular species of animal being fed, and the particular starch derivative and D.S. thereof employed.

The following amino alkyl ethers of starch are illustrative of those useful in this invention.

β-methyl amino ethyl ether of starch
β-amino propyl ether of starch
β-dimethyl amino ethyl ether of starch
β-n-butyl amino ethyl ether of starch
β-di-n-butyl amino ethyl ether of starch
β-phenyl amino ethyl ether of starch
β-benzyl amino ethyl ether of starch The oral administration of amino alkyl ethers of starch in accordance with this invention can be accomplished in the form of tablets, capsules, powders, solutions, suspensions or in admixture with one or more components of the animal's diet. Alternatively, the amino alkyl ethers of starch can be administered in an equivalent amount in the animal's drinking water.

Conventional ruminant feed rations generally comprise at least about 2 percent plant ingredients such as hay, straw, silage, yellow corn, pasturage, ground corn cobs, cottonseed hulls, cotton mill wastes, beet pulp, corn meal, soybean meal, wheat bran, wheat middlings, dehydrated alfalfa, ground oats, millet, linseed meal, coconut meal, distillers, dried grains, peanut meal, cottonseed meal and the like plant products. Most ruminant feed rations also contain up to about 2 percent mineral ingredients such as bone meal, limestone, salt (NaCl) and the various trace minerals including salts of zinc, copper, manganese, cobalt, iodine, iron and the like. Other materials which can be incorporated into ruminant feed rations in varying amounts include animal ingredients such as fish meal, meat and bone scraps, dried milk, animal fats, dried whey solubles and the like; vitaminaceous ingredients such as vitamins A, $B_{12}$, D and K, as well as the B vitamins such as riboflavin, niacin, pantothenic acid or salts thereof, choline, pyridoxine, thiamine, nicotinic acid or salts thereof, biotin, folic acid and the like; amino acids such as methionine, phenylalanine, arginine, glycine, histidine, isoleucine, leucine, lysine, theronine, tryptophan, valine and the like; medicaments such an antibiotics, steroids, arsenicals, anthelmintics and the like, and antioxidants, for example, 6-ethoxy-2,2,4-trimethyl-1,2-dihydroquinoline, butylated hydroxy anisol, butylated hydroxy toluene, 4,4-bis(2,6-di-t-butyl phenol), gamma-tocopherol, esters of gallic acid, and the like.

The feed compositions of this invention can be prepared by incorporating the amino alkyl ethers of starch in various ways into any or all components of conventional diets for the type of animal in question. The amino alkyl ethers of starch can be added to the diet rations as the pure compounds, as a stabilized concentrate wherein the amino alkyl ethers of starch are coated with a protective material such as gelatine or gelatine and sugar, as an adsorbate on silica gel, oatmeal, soybean meal, ion-exchange resins, as a simple admixture with a diluent such as cereal meal, and oil meal and stabilizers, or in solution or emulsion in a vegetable oil such as peanut oil, soybean oil, sesame oil and the like and preferably including a stabilizer. An oil solution or emulsion lends itself to spraying on the basal ration. Alternatively, the amino alkyl ethers of starch can be mixed with other feed additives such as vitamins, antibiotics, minerals and other materials of this nature in a feed supplement which is supplied to grain mills or to feed manufacturers who then incorporate it into the finished diet to be supplied to the animals by the farmer. Blending of such materials can be accomplished in the usual type apparatus used for the preparation of dry feed products. For young animals the amino alkyl ethers of starch can be incorporated into liquid or semi-liquid feeds or mashes in the form of a suspension or dispersion of the active material. An emulsion or dispersion in peanut oil, soybean oil, and the like can be prepared and these are particularly adapted for liquid compositions including drinking water. The amino alkyl ethers of starch can be administered alone to the animals but it is more convenient and effective to use the active material in the animals' feed composition.

Although the invention is described with respect to specific modifications, the details thereof are not to be construed as limitations.

The embodiments of the invention in which an exclusive property or privilege is claimed are defined as follows:

1. A method of improving the growth response in an animal selected from the group consisting of poultry, swine and ruminants which comprises orally administering to said animal a growth-promoting amount of an amino alkyl ether of starch of the formula

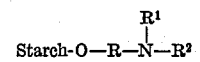

wherein R is alkylene of at least 2 and not more than 3 carbon atoms, and $R^1$ and $R^2$ are selected from the group consisting of hydrogen, alkyl of 1 through 18 carbon atoms, phenyl, biphenyl, naphthyl, benzyl, phenylethyl and diphenylmethyl, said amino alkyl ether of starch having a D.S. of at least 0.01 and not more than 3.

2. Method of claim 1 wherein the animal is a ruminant.

3. A method of promoting the growth response in an animal selected from the group consisting of poultry, swine and ruminants which comprises feeding said animal a composition comprising an animal feed component and a growth-promoting amount of an amino alkyl ether of starch of the formula

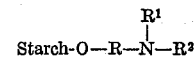

wherein R is alkylene of at least 2 and not more than 3 carbon atoms, and $R^1$ and $R^2$ are selected from the group consisting of hydrogen, alkyl of 1 through 18 carbon atoms, phenyl, biphenyl, naphthyl, benzyl, phenylethyl and diphenylmethyl, said amino alkyl ether of a starch having a D.S. of at least 0.01 and not more than 3.

4. Method of claim 3 wherein the animal is a ruminant.
5. Method of claim 1 wherein $R^1$ and $R^2$ are hydrogen.
6. Method of claim 1 where $R^1$ and $R^2$ are alkyl.
7. Method of claim 1 wherein $R^1$ is hydrogen and $R^2$ is alkyl.
8. Method of claim 1 wherein R is ethylene and $R^1$ and $R^2$ are hydrogen.
9. Method of claim 1 wherein R is ethylene and $R^1$ and $R^2$ are methyl.
10. Method of claim 1 wherein R is ethylene and $R^1$ and $R^2$ are ethyl.
11. A feed composition comprising a feed for an animal selected from the group consisting of poultry, swine and ruminants and a growth-promoting amount of from about 0.0001% to about 0.1% by weight of the composition of an amino alkyl ether of starch of the formula

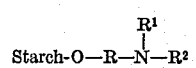

wherein R is alkylene of at least 2 and not more than 3 carbon atoms, and $R^1$ and $R^2$ are selected from the group consisting of hydrogen, alkyl of 1 through 18 carbon atoms, phenyl, biphenyl, naphthyl, benzyl, phenylethyl and diphenylmethyl, said amino alkyl ether of starch having a D.S. of at least 0.01 and not more than 3.

12. Composition of claim 11 wherein $R^1$ and $R^2$ are hydrogen.

13. Composition of claim 11 wherein $R^1$ and $R^2$ are alkyl.

14. Composition of claim 11 wherein R is ethylene and $R^1$ and $R^2$ are hydrogen.

15. Composition of claim 11 wherein R is ethylene, $R^1$ is hydrogen and $R^2$ is alkyl.

References Cited

UNITED STATES PATENTS

| 1,609,064 | 11/1926 | Corbett | 99—2 |
|---|---|---|---|
| 2,443,897 | 6/1948 | Dexter et al. | 127—66 |
| 2,725,313 | 11/1955 | Smith et al. | 99—2 |
| 2,813,093 | 11/1957 | Caldwell et al. | 260—233.3 |
| 2,975,124 | 3/1961 | Caldwell et al. | 260—233.3 |
| 3,208,999 | 9/1965 | Jarowenko et al. | 260—233.3 |
| 3,372,032 | 3/1968 | Tittelboom | 99—2 |

ALBERT T. MEYERS, Primary Examiner

F. E. WADDELL, Assistant Examiner

U.S. Cl. X.R.

424—325, 361